United States Patent
McKenzie

(10) Patent No.: US 6,746,069 B1
(45) Date of Patent: Jun. 8, 2004

(54) INTERIOR VEHICLE COVER SYSTEM FOR USE WITH A VEHICLE

(75) Inventor: John S. McKenzie, Ferndale, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 10/326,619

(22) Filed: Dec. 20, 2002

(51) Int. Cl.$^7$ .............................................. B60N 2/44
(52) U.S. Cl. ...................... 296/63; 296/152; 296/97.8; 296/97.9; 297/84.1; 2/48
(58) Field of Search .................... 296/37.13, 37.15, 296/152, 1.07, 97.8, 97.9, 63, 65.01, 153; 297/184.11, 184.1; 160/24, 370.22, 352; 2/456, 22, 463, 48, 82, 911

(56) References Cited

U.S. PATENT DOCUMENTS

| | | | | |
|---|---|---|---|---|
| 1,985,222 A | * | 12/1934 | Menhall | 297/223 |
| 2,804,914 A | * | 9/1957 | Butcko et al. | 297/229 |
| 3,537,746 A | * | 11/1970 | Peters | 296/78.1 |
| 4,118,066 A | * | 10/1978 | Ricke | 297/184.11 |
| 4,171,145 A | * | 10/1979 | Pearson, Sr. | 296/78.1 |
| 4,320,922 A | * | 3/1982 | Meritis | 297/220 |
| 4,600,238 A | * | 7/1986 | Goodford | 297/219.1 |
| 4,790,592 A | * | 12/1988 | Busso et al. | 297/184.11 |
| 4,818,007 A | * | 4/1989 | Mahoney | 296/24.1 |
| 5,080,431 A | * | 1/1992 | Frazier | 297/184.11 |
| 5,181,275 A | | 1/1993 | Spulgis | |
| 5,330,251 A | * | 7/1994 | McGuire | 297/229 |
| 5,588,698 A | * | 12/1996 | Hsueh | 297/184.11 |
| 5,655,817 A | | 8/1997 | Nienow | |
| 5,701,605 A | | 12/1997 | Bowen | |
| 5,799,795 A | | 9/1998 | Mease | |
| 5,964,161 A | | 10/1999 | Conway | |
| 6,095,058 A | | 8/2000 | Earnhart | |
| 6,158,805 A | * | 12/2000 | Blaney | 297/184.11 |
| 6,260,917 B1 | | 7/2001 | Marechal | |
| 6,347,590 B1 | | 2/2002 | D'Annunzio et al. | |
| 6,382,720 B1 | * | 5/2002 | Franklin et al. | 297/228.13 |
| 6,401,927 B1 | | 6/2002 | Sorensen et al. | |
| 6,412,851 B1 | * | 7/2002 | Burks et al. | 296/98 |
| 2002/0024232 A1 | * | 2/2002 | Ames et al. | 296/146.2 |

* cited by examiner

Primary Examiner—D. Glenn Dayoan
Assistant Examiner—Patricia L. Engle
(74) Attorney, Agent, or Firm—Bill C. Panagos

(57) ABSTRACT

A cover system for use with a vehicle having a seat includes a mounting member that is attachable to the vehicle. The cover system further includes a cover movably associated with the mounting member such that the cover is unrollable from a stored position to a deployed position in which the cover extends at least partially over the seat.

28 Claims, 4 Drawing Sheets

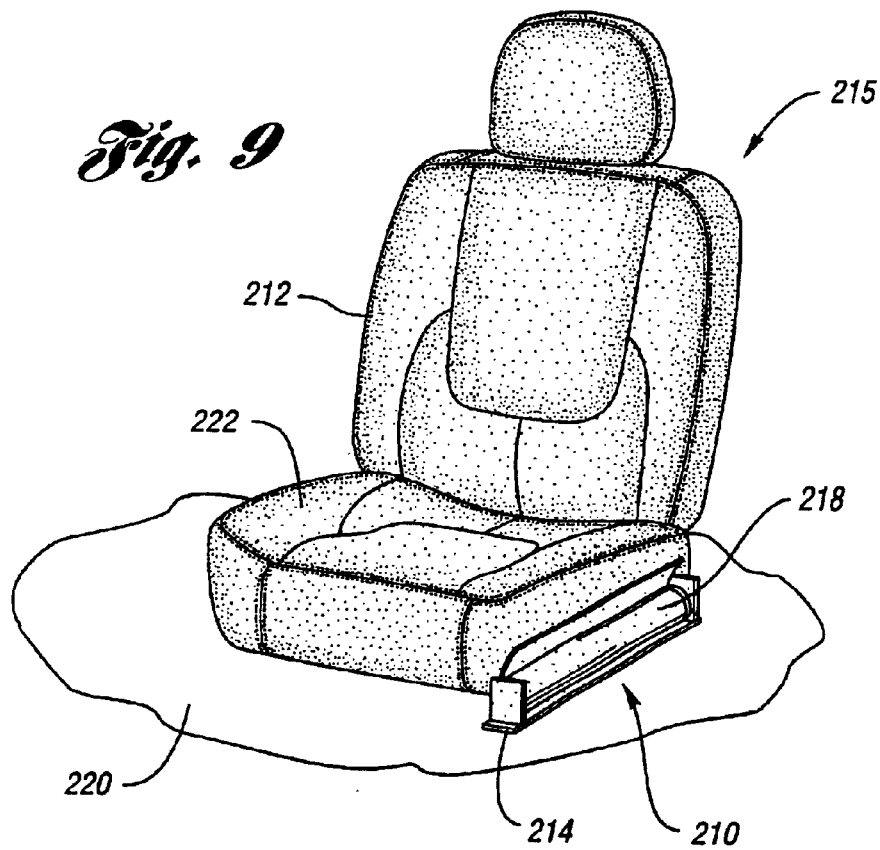
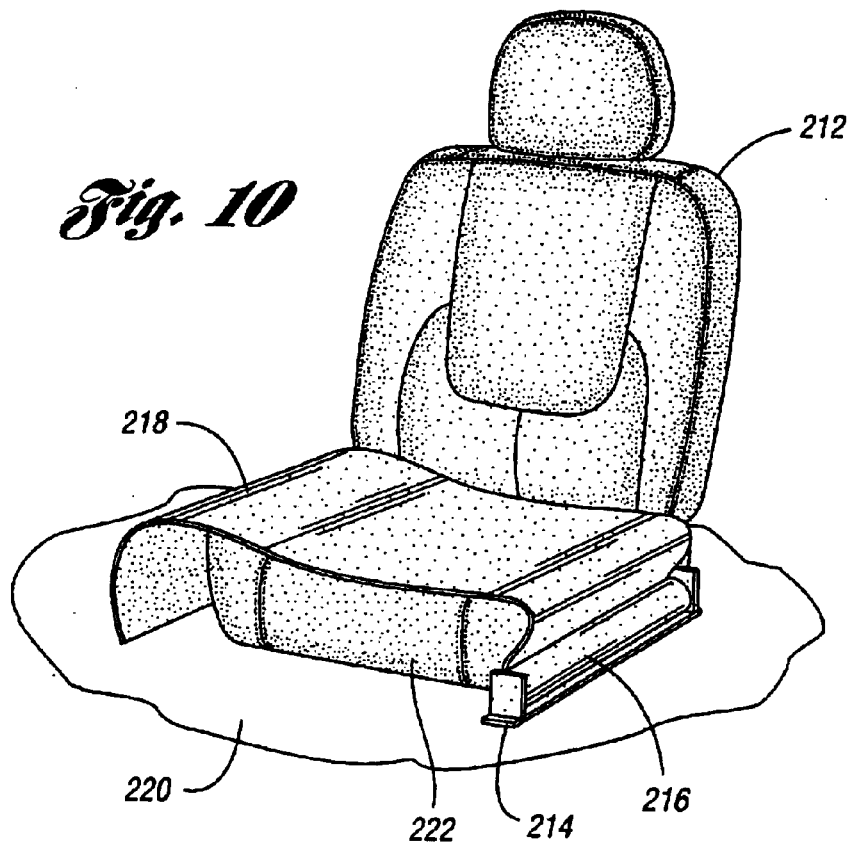

INTERIOR VEHICLE COVER SYSTEM FOR USE WITH A VEHICLE

BACKGROUND OF THE INVENTION

1. Field of the Invention

The invention relates to a cover system for use with a vehicle.

2. Background Art

Various cover systems have been developed for use with motor vehicles. Some of these systems are designed to protect a person's clothing from food and drink spills when he or she is seated in a vehicle seat. Examples of such systems are disclosed in U.S. Pat. Nos. 5,701,605 and 6,095,058.

SUMMARY OF THE INVENTION

According to one aspect of the invention, a cover system for use with a vehicle having a seat includes a mounting member that is attachable to the vehicle. The cover system further includes a cover movably associated with the mounting member such that the cover is unrollable from a stored position to a deployed position in which the cover extends at least partially over the seat.

BRIEF DESCRIPTION OF THE DRAWINGS

FIG. 9 is a perspective view of a third embodiment of a cover system according to the invention, wherein the cover system includes a mounting member attached to a vehicle floor, and a cover associated with the mounting member, the cover being shown in a stowed position; and FIG. 10 is a perspective view of the cover system of FIG. 8, with the cover shown in a deployed position.

DETAILED DESCRIPTION OF THE PREFERRED EMBODIMENT(S)

Figure 1:
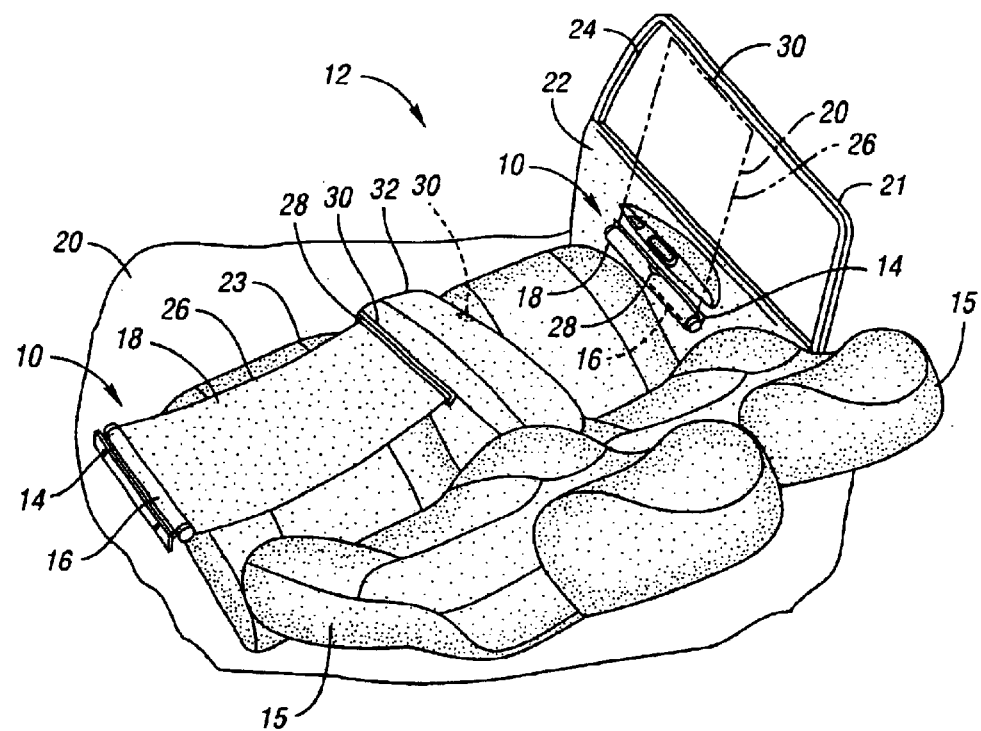
FIG. 1 is a perspective view of two cover systems according to the invention installed in a vehicle, wherein each cover system includes a mounting member attached to the vehicle, a rotatable member associated with the mounting member, and a cover attached to the rotatable member.

FIG. 1 shows two cover systems 10 according to the invention installed in a motor vehicle 12. Each cover system 10 includes a mounting member, such as a frame 14, attached to the vehicle 12 proximate a respective vehicle seat 15, a rotatable member 16 associated with the frame 14, and a flexible cover 18 associated with the rotatable member 16.

While each frame 14 may be attached to any suitable vehicle structure, such as a respective vehicle seat 15 or vehicle floor 20, each frame 14 is attached to a respective vehicle door 21 in the embodiment shown in FIG. 1. Furthermore, each frame 14 may be attached to a respective vehicle door 21, or other vehicle structure, in any suitable manner, such as with fasteners and/or adhesive. As another example, each frame 14 may be formed integrally with a respective vehicle door 21, vehicle seat 15, vehicle floor 20, or other vehicle structure. More specifically, for instance, each frame 14 may be formed integrally with vehicle door trim panel 22 of vehicle door 21. Moreover, each frame 14 may be made of any suitable material, such as plastic, steel or aluminum.

Each cover 18 is movable between a rolled-up or stowed position (shown on the right side of FIG. 1) and a first deployed position (shown on the left side of FIG. 1) in which the cover 18 extends at least partially over a seat bottom cushion 23 of a respective vehicle seat 15. In the embodiment shown in FIG. 1, each cover 18 is configured to extend laterally over the entire width of a respective seat bottom cushion 23, and is further configured to be spaced away from the seat bottom cushion 23, when the cover 18 is unrolled to the first deployed position. When each cover 18 is in the stowed position, each cover 18 is at least partially rolled onto or wrapped around a respective rotatable member 16. In the embodiment shown in FIG. 1, a majority of each cover 18 is rolled onto or wrapped around a respective rotatable member 16. Each cover 18 may also be movable between either the stowed position or the first deployed position and a second deployed position (shown in phantom on the right side of FIG. 1) in which the cover 18 extends at least partially adjacent to a vehicle window 24.

When a cover 18 is moved to the first deployed position, the cover 18 is useable to protect a seat occupant's lap from food and/or drink spills. When a cover 18 is moved to the second deployed position, the cover 18 may function as a shade that covers at least a portion of a respective vehicle window 24.

Each cover 18 includes a cover body 26 that may be made of any suitable material, such as a disposable material or a washable material. For example, each cover body 26 may comprise disposable paper towel or a washable fabric, rubber or plastic layer or film. Moreover, suitable fabrics may comprise natural and/or synthetic fibers or materials.

Furthermore, each cover 18 may include one or more first fastening members 28 attached to the cover body 26 and cooperable with one or more second fastening members 30, attached to the vehicle 12, for securing the cover 18 in the first and/or second deployed positions. For the cover 18 shown on the left side of FIG. 1, for example, the first fastening member 28 is configured as a either a hook or loop fastening strip that is engageable with a corresponding second fastening member 30, which is configured as a mating hook or loop fastening strip, attached to a floor console 32. As another example, referring to the right side of FIG. 1, the first fastening member 28 may be configured as a clip or latch that is configured to engage or otherwise mate with a corresponding second fastening member 30, such as a catch or aperture. Alternatively, the fastening members 28 and 30 may have any suitable configuration, such as buttons, buckles, clasps, etc., sufficient to secure each cover 18 in the first and/or second deployed positions.

Figure 2:
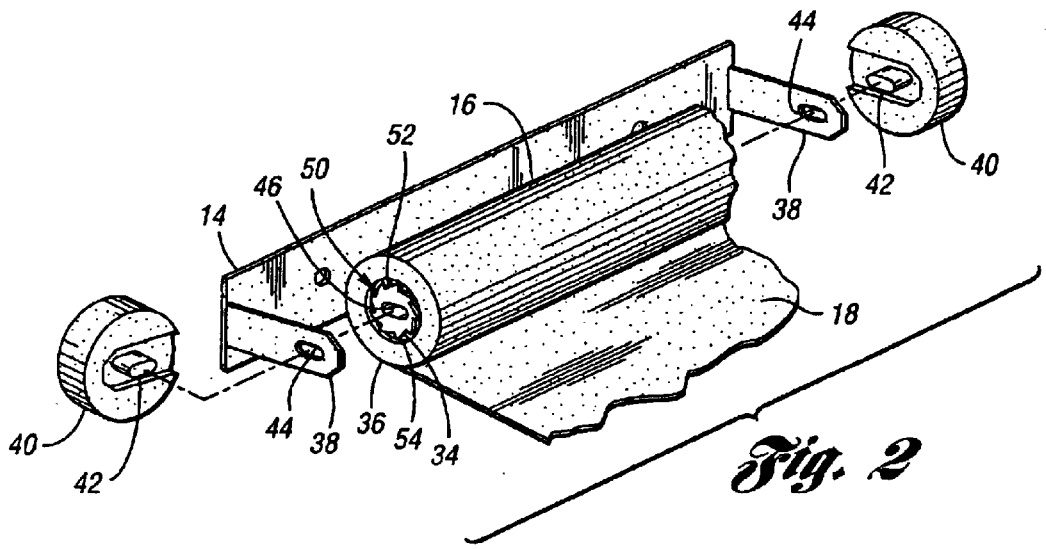
FIG. 2 is an exploded perspective view of one of the cover systems shown in FIG. 1.

Each rotatable member 16 may be attached to or otherwise associated with a respective frame 14 such that at least a portion of the rotatable member 16 is rotatable with respect to the frame 14. Referring to FIG. 2, for example, each rotatable member 16 may include an inner portion 34 attached to a respective frame 14 in any suitable manner, and an outer portion 36 disposed about the inner portion 34 and rotatable with respect to the inner portion 34. In the embodiment shown in FIG. 2, the inner portion 34 is attached to frame legs 38 with removable end caps 40. Each end cap 40 includes a keyed projection 42 that mates with complementary apertures 44 and 46 formed in one frame leg 38 and one end of the inner portion 34. With such a configuration, the inner portion 34 remains stationary as the outer portion 36 rotates about the inner portion 34.

Alternatively, each rotatable member 16 may be configured such that the entire rotatable member 16 rotates with respect to a respective frame 14. For example, the rotatable member 16 may be configured as a hollow tube that surrounds a cylindrical member attached between frame legs 38.

Figure 3:
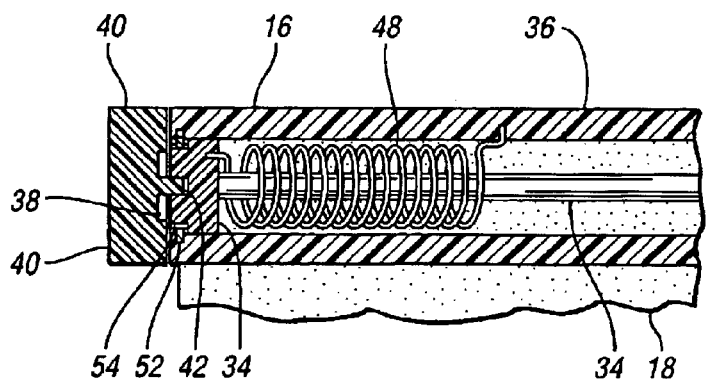
FIG. 3 is a fragmentary cross-sectional view of one of the cover systems shown in FIG. 1.

Each rotatable member 16 may also be configured as a retractor mechanism for retracting the associated cover 18 from one of the deployed positions toward to the stowed position. Referring to FIG. 3, for example, a coil spring 48 may be attached to a respective inner portion 34 and a respective outer portion 36. With such a configuration, tension in the spring 48 increases as the outer portion 36 rotates with respect to the inner portion 34. This tension is used to retract the associated cover 18 toward the stowed position.

Referring to FIGS. 2 and 3, each rotatable member 16 may also include a ratchet device 50 for inhibiting retraction of a respective cover 18. For example, each respective outer portion 36 may include one or more pawls 52 that are engageable with one or more teeth 54 formed on an outer surface of the inner portion 34. In the embodiment shown in FIGS. 2 and 3, the pawls 52 are movable, with respect to the remainder of the outer portion 36, by gravity and function to lock movement of the outer portion 36 with respect to the inner portion 34. When a respective cover 18 is pulled away from the associated frame 14 and allowed to return toward the frame 14 in a sufficiently quick motion, the respective outer portion 36 is able to rotate about the inner portion 34 such that the pawls 52 are inhibited from engaging the teeth 54. As a result, the spring 48 is able to retract the cover 18 all the way to the stowed position.

Still referring to FIG. 3, each cover 18 may be attached to or otherwise associated with a respective rotatable member 16 in any suitable member. For example, each cover 18 may be attached to a respective outer portion 36 with one or more hook and loop fasteners, adhesive strips, clips, etc. With such a configuration, each cover 18 may removed from a respective rotatable member 16 such that the cover 18 may be washed or replaced. As another example, each cover 18 may be permanently attached to a respective rotatable member 16 such that replacement of the cover 18 also requires replacement of the rotatable member 16.

Figure 4:
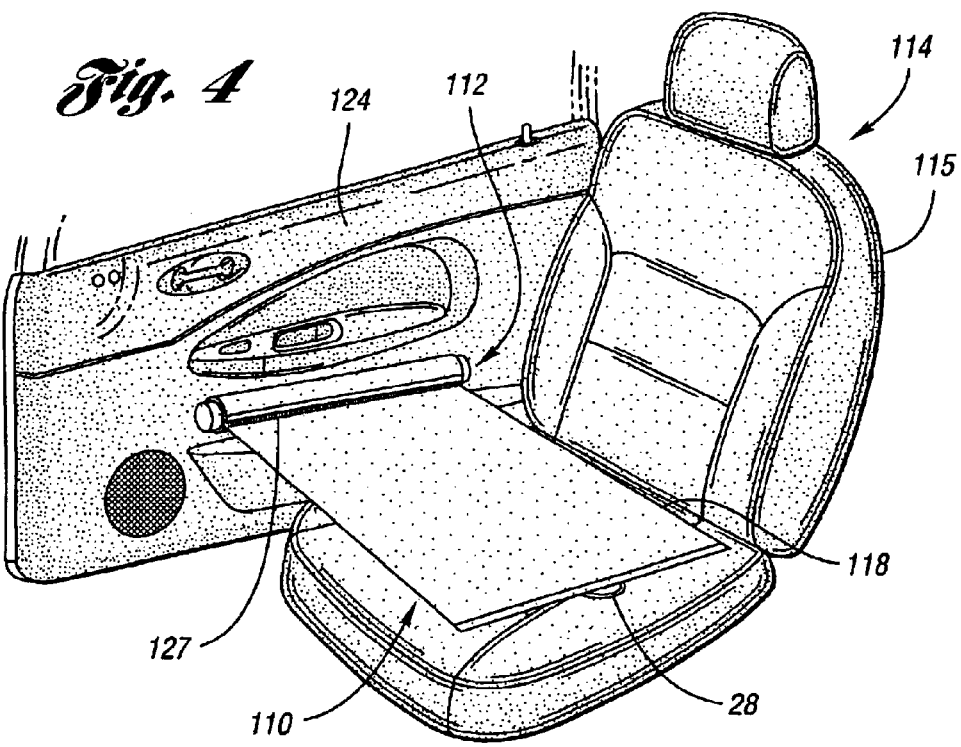
FIG. 4 is a perspective view of a second embodiment of a cover system according to the invention, wherein the mounting member is configured as a housing.
Figure 5:
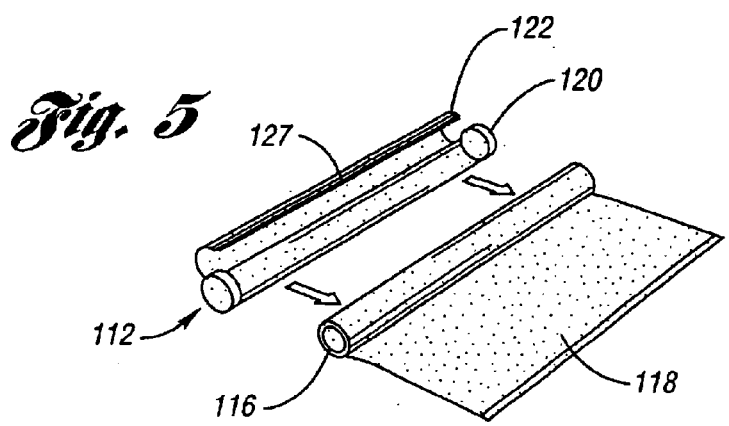
FIG. 5 is an exploded perspective view of the cover system shown in FIG. 4.

A second embodiment 110 of a cover system according to the invention is shown in FIGS. 4 and 5. The cover system 110 includes a mounting member, such as a frame or housing 112, attached to a vehicle 114 proximate a vehicle seat 115, a rotatable member 116 associated with the housing 112, and a cover 118 associated with the rotatable member 116.

The housing 112 includes a main portion 120 that is attachable to a vehicle structure, and a movable portion 122 attached to the main portion 120 and movable with respect to the main portion 120, between a closed position (shown in FIG. 4) and an open position (shown in FIG. 5), for allowing the cover 118 to be inserted into and removed from the housing 112. While the main portion 120 may be attached to any suitable vehicle structure, such as described above with respect to the frames 14, the main portion 120 is attached to a vehicle door 124 in the embodiment shown in FIG. 4. Furthermore, the main portion 120 may be attached to the vehicle door 124, or other vehicle structure, in any suitable manner, such as with adhesives or fasteners.

Figure 6:
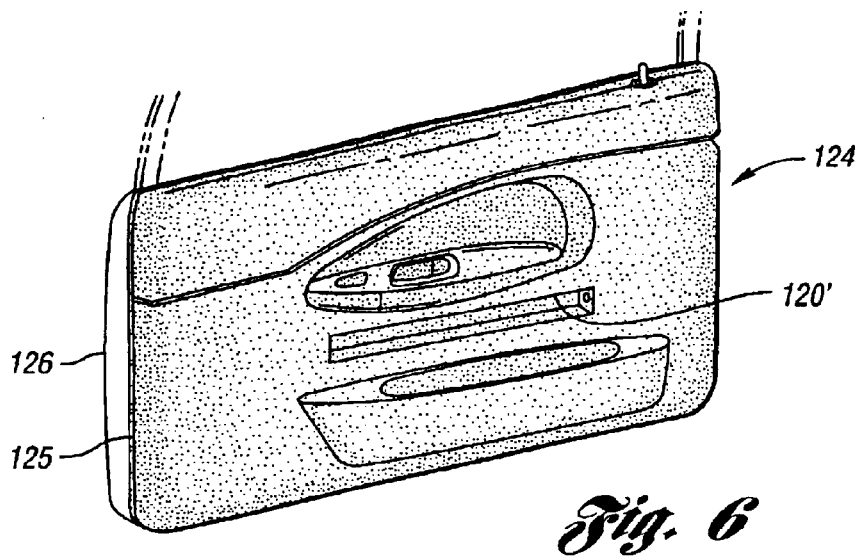
FIG. 6 is a fragmentary perspective view showing a portion of the housing formed integrally with a vehicle door trim panel.

As another example, the main portion 120 may be formed integrally with any suitable vehicle structure, such as vehicle door 124 or vehicle floor. For instance, FIG. 6 shows main portion 120' formed integrally with molded plastic vehicle door trim panel 125, which is attachable to door outer structure 126 of a vehicle body.

Returning to FIGS. 4 and 5, the movable portion 122 may be attached to the main portion 120 in any suitable manner, such as with a fabric strip that is adhesively bonded to the portions 120 and 122 and that functions as a hinge. As another example, the movable portion 122 may be formed integrally with the main portion 120 such that a living hinge is defined between the portions 120 and 122. Furthermore, when the movable portion 122 is in the closed position, a slot is defined between the main portion 120 and the movable portion 122 for allowing the cover 118 to be unrolled from the rotatable member 116.

The housing 112 may also include one or more brushes attached to the main portion 120 and/or movable portion 122 for removing food crumbs or other residue from the cover 118. In the embodiment shown in FIGS. 4 and 5, for example, the housing 112 includes a long, narrow brush 127 attached to the movable portion 120 and engageable with the cover 118 when the movable portion 120 is in the closed position shown in FIG. 4.

Figure 7:
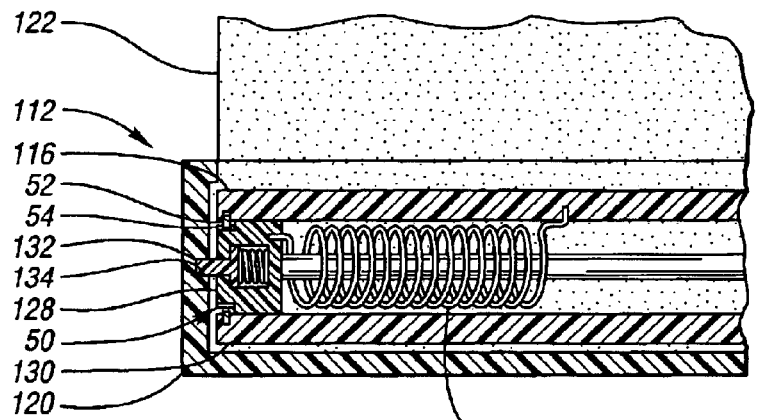
FIG. 7 is a fragmentary cross-sectional view of the cover system of FIG. 4.

The rotatable member 116 may be attached to or otherwise associated with the housing 112 in any suitable manner such that at least a portion of the rotatable member 116 is rotatable with respect to the housing 112. Referring to FIG. 7, for example, the rotatable member 116 may include an inner portion 128 and an outer portion 130 disposed about the inner portion 128 and rotatable with respect to the inner portion 128. In the embodiment shown in FIG. 7, the inner portion 128 includes a retractable projection 132 at each end (only one end shown), and each retractable projection 132 is engageable with a corresponding recess 134 formed in the main portion 120 of the housing 112. The projections 132 and recesses 134 may be suitably shaped, such as described above with respect to the projections 42 and apertures 44 and 46, so as to inhibit rotational movement of the inner portion 128 as the outer portion 130 rotates about the inner portion 128. The rotatable member 116 may also be configured as a retractor mechanism and/or include a ratchet device 50, such as described above in detail.

The cover 118 may be attached to or otherwise associated with the rotatable member 116 in any suitable manner, such as described above with respect to each cover system 10. Furthermore, the cover 118 may include any or all of the features described above with respect to each cover 18, and may be movable in the same manner as described above with respect to each cover 18. In addition, the cover 118 may be made of any suitable material, such as described above with respect to each cover 18.

Figure 8:
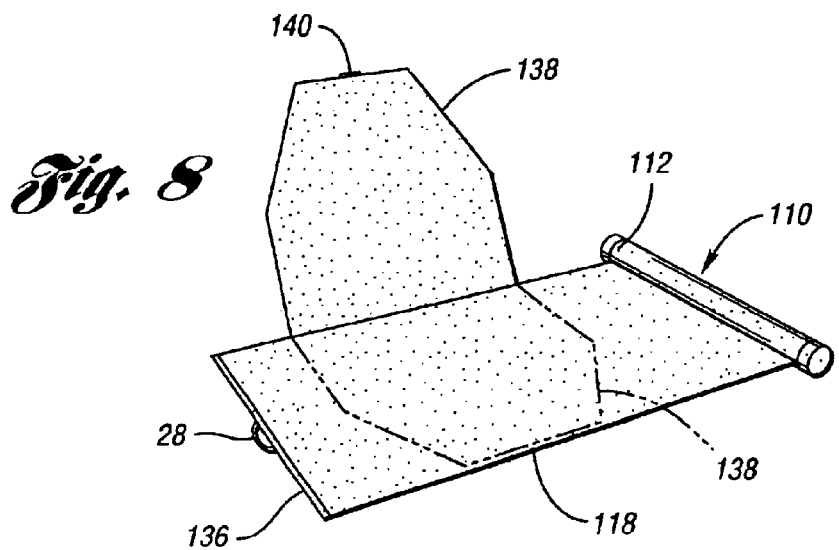
FIG. 8 is a perspective view of the cover system of FIG. 4, showing an optional fold-up cover section that is configured to at least partially cover a torso of a vehicle seat occupant.

Referring to FIG. 8, the cover 118 may also be configured as a multi-layer or multi-section cover for providing additional protection to a seat occupant. For example, the cover 118 may include a first or main section 136 and a second or fold-up section 138 that is movable upwardly with respect to the first section 136 when the cover 118 is in the first deployed position. With such a configuration, the second section 138 may be used to at least partially cover the torso of the seat occupant. Furthermore, the second section 138 may be provided with a fastening element 140, such as a clip or clasp, that is engageable with the seat occupant, such as with a shirt collar of the seat occupant, so as to secure the second section 138 in a use position shown in FIG. 8. The fastening element 140 may also be engageable with the first section 136 to secure the second section 138 against the first section 136 when the second section 138 is folded together with the first section 136, as shown in phantom in FIG. 8. With such a configuration, the housing 112 may be provided without any brushes 127 if desired.

FIGS. 9 and 10 show a third embodiment 210 of a cover system, according to the invention, that is configured to protect a vehicle seat 212 from moisture, such as from wet clothing. The cover system 210 includes a mounting member, such as a frame 214, attached to a vehicle 215 proximate vehicle seat 212, a rotatable member 216 associated with the frame 214, and a cover 218 associated with the rotatable member 216.

While the frame 214 may be attached to any suitable vehicle structure, such as described above with respect to the frames 14, the frame 214 is attached to vehicle floor 220 in the embodiment shown in FIGS. 9 and 10. For example, the frame 214 may be attached to vehicle floor 220 with respect or adhesive. As another example, the frame 214 may be formed integrally with the vehicle floor 220, or other vehicle structure.

Furthermore, the rotatable member 216 may be attached to or otherwise associated with the frame 214 in any suitable manner. For example, the rotatable member 216 may include a projection at each end that engages a corresponding recess or aperture in the frame 214. Furthermore, one or both of the projections may be retractable to facilitate positioning of the rotatable member 216 within the frame 214. As another example, the rotatable member 216 may be configured as a hollow tube that surrounds a cylindrical member attached between opposite ends of the frame 214.

The cover 218 is attached to or otherwise associated with the rotatable member 216 such that the cover 218 may be rolled onto the rotatable member. The cover 218 is unrollable from a stored position shown in FIG. 9 to a deployed position shown in FIG. 10 in which the cover 218 extends at least partially over the vehicle seat 212. In the embodiment shown in FIG. 10, the cover 218 extends across the entire width of seat bottom cushion 222 of vehicle seat 212 and is also in contact with the seat bottom cushion 222 when the cover 218 is in the deployed position.

Furthermore, the cover 218 may be made of any suitable material. In the embodiment shown in FIGS. 9 and 10, for example, the cover 218 is made of an absorbent material, such as terry cloth.

The cover 218 may also include one or more fastening members, such as described above, for securing the cover 218 in the deployed position. For example, the cover 218 may include a first fastening member that is engageable with a second fastening member disposed on the vehicle floor 220 or on a side of the vehicle seat 212 opposite from the side adjacent to the frame 214. Moreover, the rotatable member 216 may be configured as a retractor mechanism, such as described above in detail, for retracting the cover 218 from the deployed position toward the stowed position. In addition, the rotatable member 216 may include a ratchet device, such as ratchet device 50 described above in detail.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention. For example, the cover 18 or cover 218 may be configured as a multi-layer or multi-section cover, such as described above with respect to the cover 118. As another example, the frame 14 or 214 may be provided with one or more brushes for removing matter from the associated cover. More generally, any feature described above with respect to a particular embodiment may be incorporated into another of the above embodiments.

What is claimed is:

1. A cover system for use with a vehicle having a seat, the cover system comprising:
   a mounting member attachable to the vehicle; and
   a cover movably associated with the mounting member such that the cover is unrollable from a stored position to a deployed position in which the cover extends at least partially over the seat for covering a lap of a seat occupant.

2. The cover system of claim 1 wherein the cover comprises an absorbent material.

3. The cover system of claim 1 wherein the cover comprises a textile.

4. The cover system of claim 1 wherein the cover comprises a plastic film.

5. The cover system of claim 1 wherein the cover includes a fastening member for securing the cover in the deployed position.

6. The cover system of claim 5 further comprising an additional fastening member mountable in the vehicle proximate the seat, the additional fastening member being cooperable with the fastening member of the cover to secure the cover in the deployed position.

7. The cover system of claim 5 further comprising a console mountable in the vehicle proximate the seat, the console including an additional fastening member that is cooperable with the fastening member of the cover to secure the cover in the deployed position.

8. The cover system of claim 1 wherein the mounting member comprises a housing, and wherein a majority of the cover is disposed in the housing when the cover is in the stored position.

9. The cover system of claim 8 wherein the housing includes a main portion attachable to the vehicle, and a movable portion attached to the main portion and movable with respect to the main portion for allowing the cover to be inserted into and removed from the housing.

10. The cover system of claim 1 further comprising a retractor mechanism disposed between the mounting member and the cover, the retractor mechanism being configured to retract the cover from the deployed position toward the stored position.

11. The cover system of claim 10 wherein at least a portion of the cover is wrapped around the retractor mechanism when the cover is in the stored position.

12. The cover system of claim 10 wherein the mounting member includes a brush that is engageable with the cover as the cover moves from the deployed position toward the stored position.

13. The cover system of claim 1 further comprising a rotatable member associated with the mounting member such that at least a portion of the rotatable member is rotatable with respect to the mounting member, wherein at least a portion of the cover is wrapped around the rotatable member when the cover is in the stored position.

14. The cover system of claim 13 further comprising an end cap engaged with the rotatable member for attaching the rotatable member to the mounting member, wherein the end cap is removable from the rotatable member to allow removal of the rotatable member and the cover from the mounting member.

15. The cover system of claim 1 wherein the cover is movable to an additional deployed position in which the cover extends at least partially adjacent to a vehicle window and functions as a window shade that covers at least a portion of the vehicle window.

16. The cover system of claim 1 wherein the cover includes first and second sections, the second section being movable upwardly with respect to the first section when the cover is in the deployed position such that the second section is useable to at least partially cover a torso of a seat occupant.

17. The cover system of claim 16 wherein the second section of the cover includes a fastening element that is attachable to the seat occupant.

18. The cover system of claim 1 further comprising a vehicle door panel attachable to the vehicle, wherein the mounting member is formed integrally with the vehicle door panel.

19. A cover system for use with a vehicle having a seat with a seat bottom cushion, the cover system comprising:
  a frame attachable to the vehicle;
  a retractor mechanism attached to the frame such that a portion of the retractor mechanism is rotatable with respect to the frame; and
  a cover attached to the retractor mechanism, the cover being movable between a stored position and a deployed position in which the cover extends at least partially over the seat bottom cushion, the cover including a fastening member for securing the cover in the deployed position, the cover further including first and second sections, the second section being movable upwardly with respect to the first section when the cover is in the deployed position such that the second section is useable to at least partially cover a torso of a seat occupant;
  wherein the retractor mechanism is operable to retract the cover from the deployed position toward the stored position, and wherein at least a portion of the cover is wrapped around the retractor mechanism when the cover is in the stored position.

20. A cover system for use with a vehicle having a seat, the cover system comprising:
  a rotatable member attachable to the vehicle proximate a side of the seat; and
  a flexible cover movably associated with the rotatable member such that the cover is laterally movable from a stored position, in which the cover is at least partially wrapped around the rotatable member, to a deployed position, in which the cover extends at least partially over the seat.

21. The cover system of claim 1 wherein the mounting member is attachable to the vehicle proximate a first side of the seat, and the cover is configured to move laterally from the first side toward a second side of the seat.

22. The cover system of claim 1 wherein the mounting member is configured to be attached to a door of the vehicle.

23. The cover system of claim 14 wherein the mounting member has a first aperture, the rotatable member has a second aperture, and the end cap has a projection that extend through the apertures for attaching the rotatable member to the mounting member.

24. The cover system of claim 19 wherein the cover is laterally movable over the seat bottom cushion for covering a lap of a seat occupant.

25. The cover system of claim 20 wherein the cover includes first and second sections, the second section being movable upwardly with respect to the first section when the cover is in the deployed position such that the second section is useable to at least partially cover a torso of a seat occupant.

26. The cover system of claim 20 wherein the cover is movable to an additional deployed position in which the cover extends at least partially adjacent to a vehicle window and functions as a window shade that covers at least a portion of the vehicle window.

27. A cover system for use with a vehicle having a seat, the cover system comprising:
  a mounting member attachable to the vehicle;
  a cover movably associated with the mounting member such that the cover is unrollable from a stored position to a deployed position in which the cover extends at least partially over the seat, the cover including a fastening member for securing the cover in the stored position; and
  a console mountable in the vehicle proximate the seat, the console including an additional fastening member that is cooperable with the fastening member of the cover to secure the cover in the stored position.

28. A cover system for use with a vehicle having a seat, the cover system comprising:
  a vehicle door panel attachable to the vehicle;
  a mounting member formed integrally with the vehicle door panel; and
  a cover movably associated with the mounting member such that the cover is unrollable from a stored position to a deployed position in which the cover extends at least partially over the seat.

* * * * *